United States Patent [19]
Huber et al.

[11] 3,981,135
[45] Sept. 21, 1976

[54] SPINNING RING SUPPORTED BY A SLIDER BEARING

[75] Inventors: Wolfgang Huber, Schweinfurt; Horst G. Schrecke, Dittelbrunn, both of Germany

[73] Assignee: SKF Industrial Trading and Development Company, B.V., Nieuwegein, Netherlands

[22] Filed: Dec. 23, 1974

[21] Appl. No.: 535,974

[30] Foreign Application Priority Data
Jan. 30, 1974 Germany............................ 2304324

[52] U.S. Cl................................. 57/124; 57/101; 57/122; 308/DIG. 1
[51] Int. Cl.².......................................... D01H 7/56
[58] Field of Search ............ 57/119, 120, 124, 122, 57/75, 101; 308/DIG. 1, DIG. 4, DIG. 5

[56] References Cited
UNITED STATES PATENTS

| | | | |
|---|---|---|---|
| 660,627 | 10/1900 | Draper | 57/124 |
| 660,631 | 10/1900 | Edwards | 57/124 |
| 2,907,165 | 10/1959 | Adams et al. | 57/75 |
| 3,324,643 | 6/1967 | Kluttz | 57/124 |
| 3,345,814 | 10/1967 | Gruet | 57/124 |
| 3,494,120 | 2/1970 | Chilpan et al. | 57/75 |
| 3,543,503 | 5/1968 | Watabe et al. | 57/75 |

*Primary Examiner*—John Petrakes
*Attorney, Agent, or Firm*—Daniel M. Rosen

[57] ABSTRACT

A slider bearing for use in a spinning ring including a plurality of bearing surfaces employing flat spiral grooves for the automatic production of an aerodynamic or hydrodynamic pressure.

13 Claims, 4 Drawing Figures

SPINNING RING SUPPORTED BY A SLIDER BEARING

The invention relates to a spinning ring equipped with a spinning traveler or a spinning loop, which is rotatably supported in a ring rail by means of a slider bearing which takes up axial and radial forces.

A spinning ring of this type is known from German Pat. No. 1,195,207, wherein the spinning ring is supported in a ring rail by means of aerostatic bearings, which take up radial and also axial forces. For this purpose, compressed air must be conducted to the bearing sites by means of choke bores located in the ring rail.

It is thus the prime object of the present invention to provide an improved support for a spinning ring so that the additional units required in the case of aerostatic support (compressors or the like) can be omitted without the functional capacity, and thus the performance and life expectancy, of the spinning or yarn rings suffering as a result.

According to the invention, the foregoing object is achieved in a spinning ring, of the type described above, by providing the slider bearing at its bearing surfaces with flat grooves for the automatic production of an aerodynamic or hydrodynamic pressure. The grooves are preferably in the form of spiral grooves.

The spinning ring supported according to the invention can rotate at a very high speed. During relative motion between the rotating spinning ring and the stationary bearing parts of the ring rail, a pressure automatically builds up in the grooves of the bearing surfaces, which pressure takes up the axial and radial forces. Since the slider bearing itself sucks in the air required to build up a lubricating film during rotation, no additional units or lines are required, as are necessary in the case of conventional supports for spinning rings. The invention thus has the advantage that no connections for pressure lines need be provided at the ring rail, a definite advantage since the ring rail is difficult to access and must also carry out vertical movements. It is of further advantage, in case of a thread break, or during the starting or stopping of the machine, that the supply of pressure medium need not be separately turned off.

In a further development of the invention, the pressure-producing grooves are worked into a conical bearing surface, on which the spinning ring, which is also equipped with a conical base, is supported. A support of this type, which can take up both radial and axial forces, can be produced easily and without great expense.

In addition, it is alternatively possible to work the spiral grooves into a bearing with a U-shaped cross-section, having legs embracing the base of the spinning ring in a pincer-like manner. In an embodiment of this type, the legs of the U-shaped bearing can consist of two bearing disks mounted in a housing, between which a spacer is arranged. This spacer can be made of a material with a low coefficient of friction, such as sintered metal or sheet metal coated with PTFE. Instead of this, it is also possible to provide the bearing surface of the spacer with pressure-producing grooves.

Additional advantages and characteristics of the invention will become more apparent from the following more detailed description taken in conjunction with the appended drawings, wherein.

Figure 1:
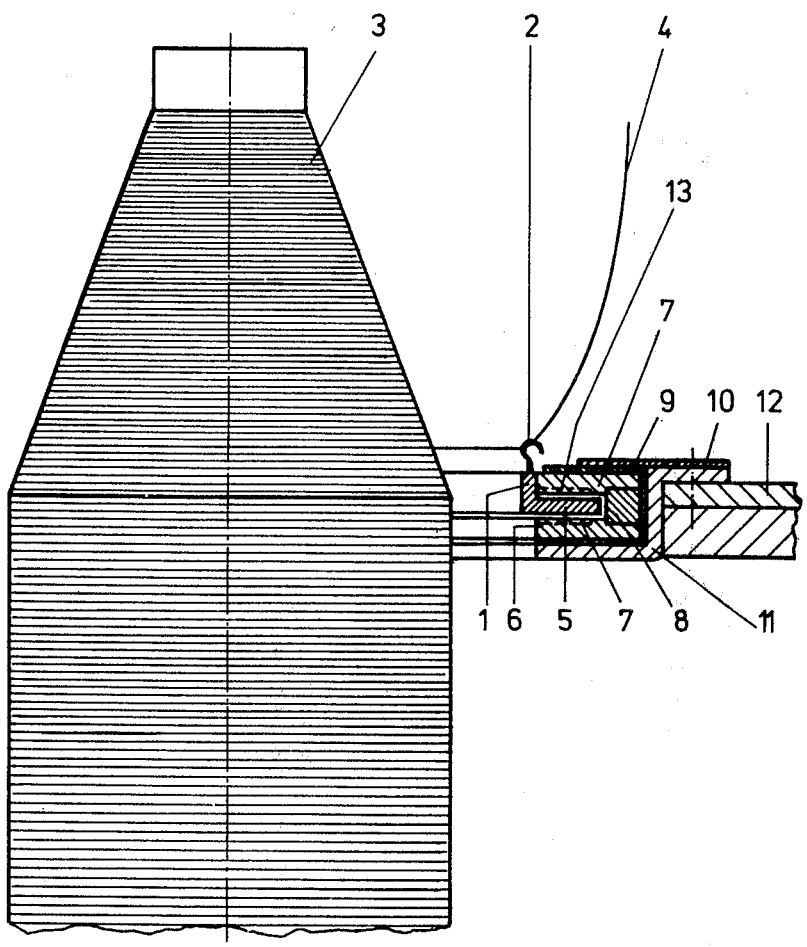
FIG. 1 is a spinning ring supported according to the invention, with an indicated spindle.

Referring to FIG. 1, there is shown a spinning ring 1 of low mass having attached thereto a spinning loop 2 made of bent wire, which serves to guide a thread 4 which is to be wound on to a spindle 3. The base 5 of the spinning ring 1 is rotatably positioned in a slider bearing. The slider bearing consists of a bearing 6 with a U-shaped cross-section, whose legs form two bearing disks 7. The two bearing disks 7 are separated from each other by a spacer 8. The spacer 8 and the two bearing disks 7 are held together by a U-shaped sheet metal ring 9. The whole slider bearing is fastened by means of a sheet metal disk 10 in a housing 11 which is connected to a ring rail 12 movable in an upward and downward direction.

Figure 3:
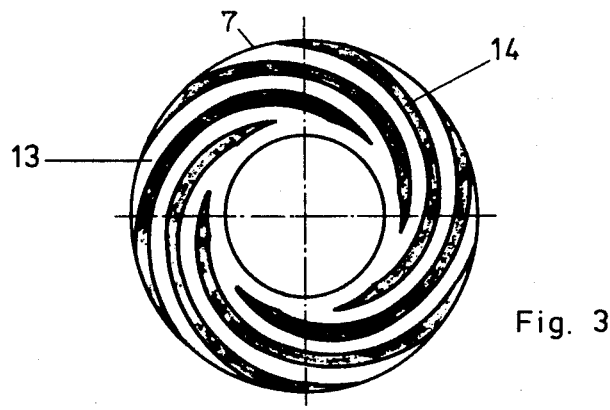
FIG. 3 is a view of a support surface in section, in reduced representation, according to section III—III of FIG. 2.

Spiral grooves 14 are worked into the two bearing disks 7 on their bearing surfaces 13 opposite the base 5 (compare FIG. 3). The spacer 8, on the other hand, is equipped with a coating of a material with antiseizure properties on its bearing surface opposite the base 5. PTFE can, by way of example, be used for the coating.

During the rotation of the spinning ring 1, a pressure builds up in the spiral grooves 14 of the two bearing disks 7, serving to take up axial forces. The aerodynamic pressure, in this case, is produced in the air present at the support sites. Hydrodynamic pressure may be produced by way of introduction of a suitable fluid in known manner.

Figure 2:
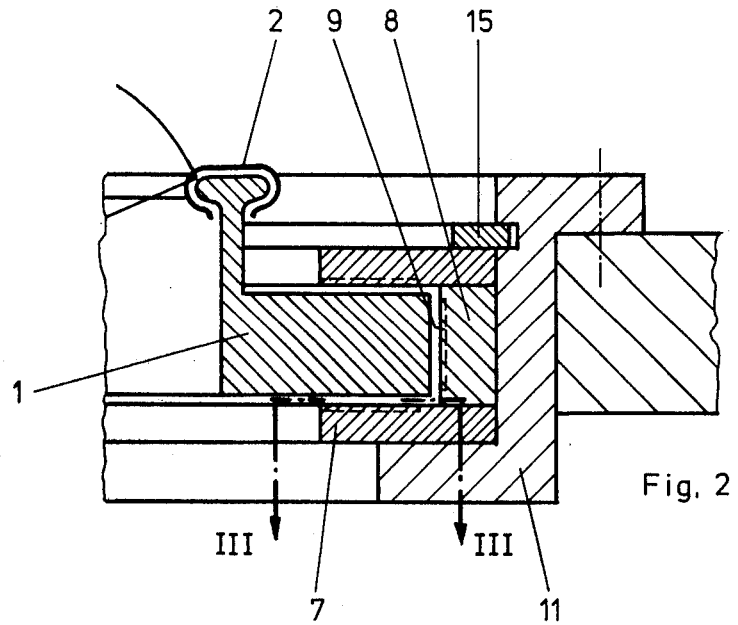
FIG. 2 is a section of a variation of FIG. 1.

In the embodiment according to FIG. 2, the spinning traveler 2 is arranged in a freely movable manner on the spinning ring 1. In contrast to the embodiment of FIG. 1, the bearing surface of the spacer 8 on the hole side is also equipped with grooves 9, which proceed in a helical manner. A guard ring 15 is used to fasten the slider bearing consisting of the two bearing disks 7 and the spacer 8 in the housing 11.

Figure 4:
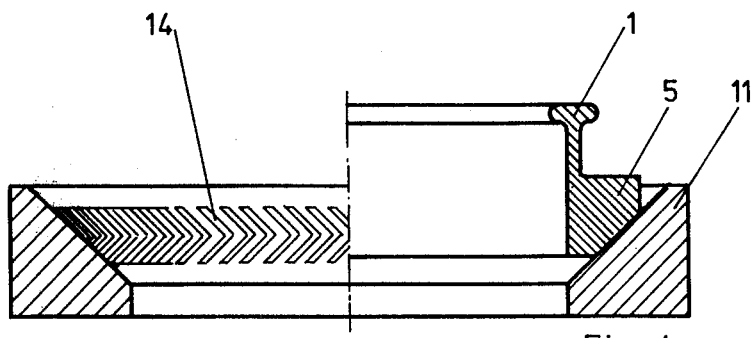
FIG. 4 is a spinning ring supported in a different manner according to the invention.

In FIG. 4, it is shown that the base 5 of the spinning ring 1 can also be made conical at its bearing surface. This has the advantage that the opposite bearing surface also need only be conical. As shown, it can be a component of the housing 11 itself, in this case. In the left half of FIG. 4, it can be seen that the grooves 14 worked into the bearing surface of the housing 11 are arranged in a fishbone manner. The aerodynamic or hydrodynamic film between the base 5 and the housing 11 is formed in the same way as previously described.

With this invention, a completely maintenance-free support for a spinning ring has been created. The production and the mounting in the ring rail is extremely simple and can be carried out without major expense. Because of the automatic pressure build-up, no additional devices are necessary for the production and control of a foreign-medium supply. As a result of the almost friction-free support, long service life of the equipment is achieved. The friction-free operation makes possible a significant increase in the spinning or twisting capacity of ring spinning machines and ring twisting machines.

Further variations, substitutions and modifications within the spirit and scope of the invention will be apparent to those skilled in the art.

What is claimed is:

1. A bearing-supported spinning ring construction including a spinning traveler or a spinning loop, and comprising a ring rail rotatably supporting said spinning ring by means of a slider bearing, said slider bearing being equipped at its bearing surfaces with a plurality of flat grooves for the exclusively automatic production of an aerodynamic or hydrodynamic pressure taking up axial and radial forces resulting from relative motion between said spinning ring and said ring rail.

2. The spinning ring of claim 1, wherein said grooves are worked into a conical bearing surface, on which said spinning ring is supported, said spinning ring further including a conical base fit into said conical bearing surface.

3. The spinning ring of claim 1, wherein said grooves are worked into a bearing of U-shaped cross-section, the legs of said bearing embracing the base of said spinning ring in a pincer-like manner.

4. The spinning ring of claim 3, wherein said legs include two bearing disks attached in a housing, and a spacer positioned between said two bearing disks.

5. The spinning ring of claim 4, wherein said grooves of said bearing disks are in the form of spiral grooves.

6. The spinning ring of claim 4, wherein said spacer comprises a material with a low coefficient of friction.

7. The spinning ring of claim 6, wherein said material is a dry sintered powdered metal.

8. The spinning ring of claim 6, wherein said material is a sheet metal.

9. The spinning ring of claim 6, wherein said material is a metal coated with PTFE.

10. A spinning ring support construction comprising a slider bearing holding said spinning ring base in a rotatable position, said slider bearing including a bearing member having a U-shaped cross-section with the legs thereof forming first and second bearing disks, a spacer separating said bearing disks, and a sheet metal ring holding said two bearing disks and spacer together, said first and second bearing disks including a plurality of spiral grooves in the bearing surfaces thereof for the automatic production of a friction reducing dynamic medium pressure taking up axial and radial forces resulting from relative motion between said spinning ring and said ring rail.

11. The construction of claim 10, wherein said spacer includes a further plurality of spiral grooves in the inner facing surface thereof.

12. The construction of claim 10, wherein said medium is aerodynamic.

13. The construction of claim 10, wherein said medium is hydrodynamic.

* * * * *

UNITED STATES PATENT AND TRADEMARK OFFICE
CERTIFICATE OF CORRECTION

PATENT NO. : 3,981,135
DATED : September 21, 1976
INVENTOR(S) : Wolfgang Huber et al It is certified that error appears in the above-identified patent and that said Letters Patent are hereby corrected as shown below:

Title page under "Foreign Application Priority Data" change "2304324" to read --2404324--.

Signed and Sealed this

Ninth Day of May 1978

[SEAL]

Attest:

RUTH C. MASON
Attesting Officer

LUTRELLE F. PARKER
Acting Commissioner of Patents and Trademarks